Sept. 11, 1962          A. P. MANSOFF          3,053,342

INTERNAL COMBUSTION ENGINE

Filed March 18, 1959          4 Sheets-Sheet 1

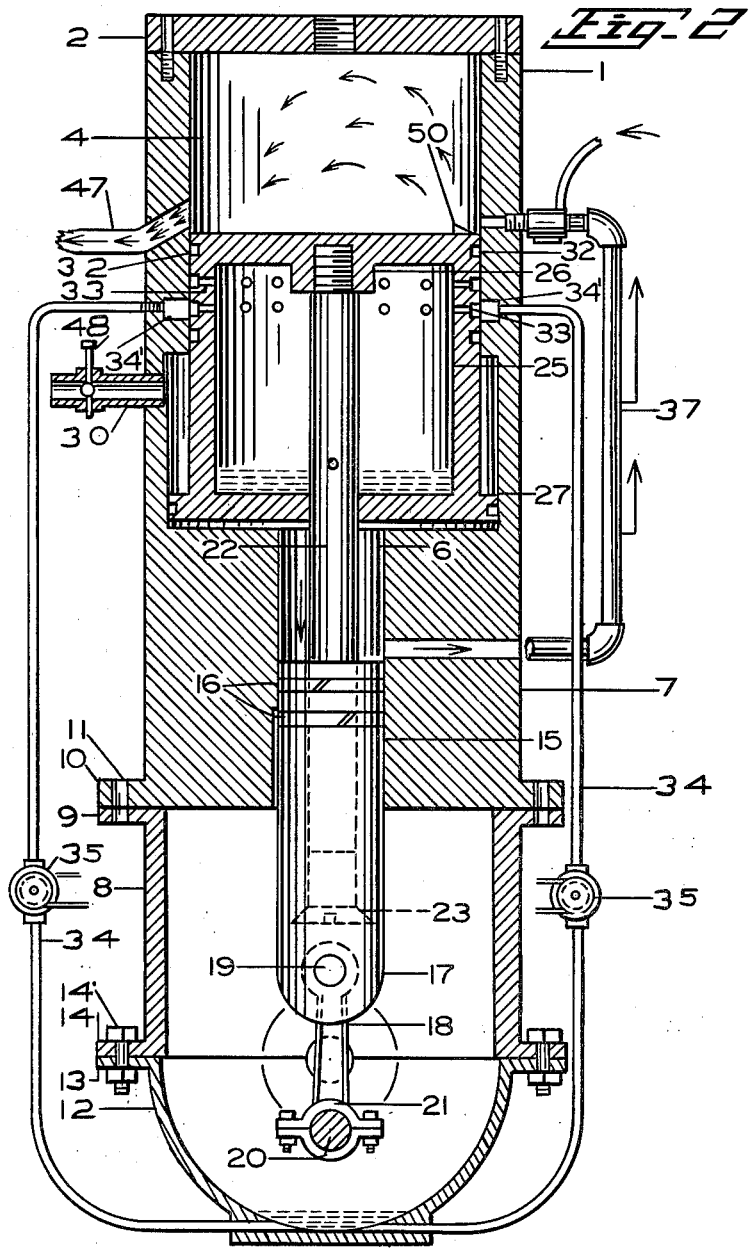

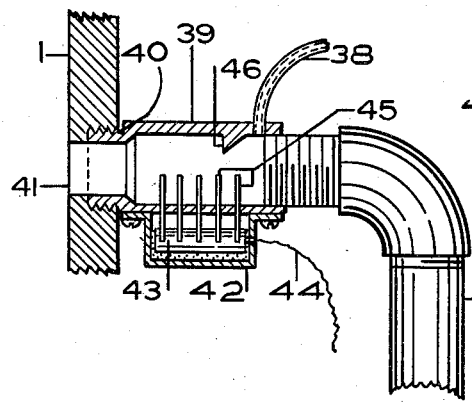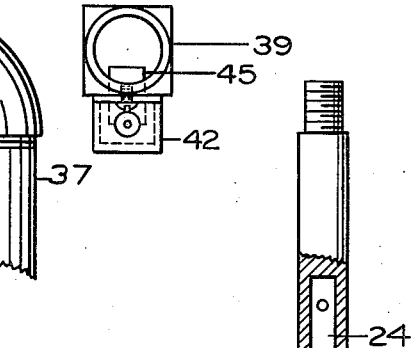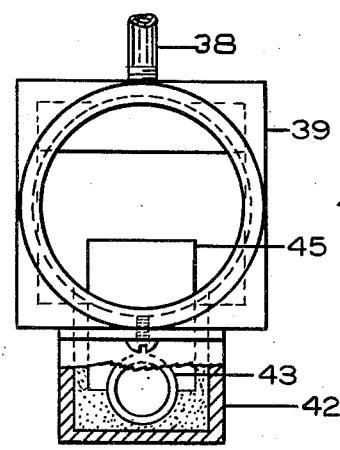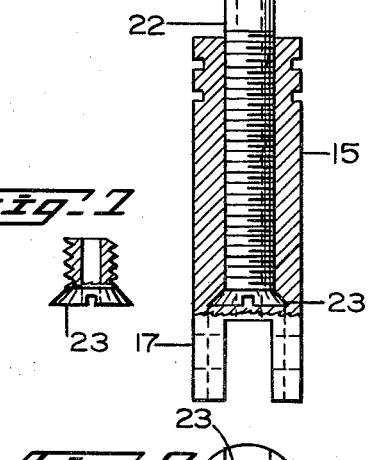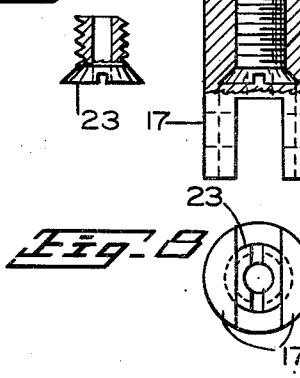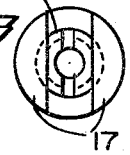

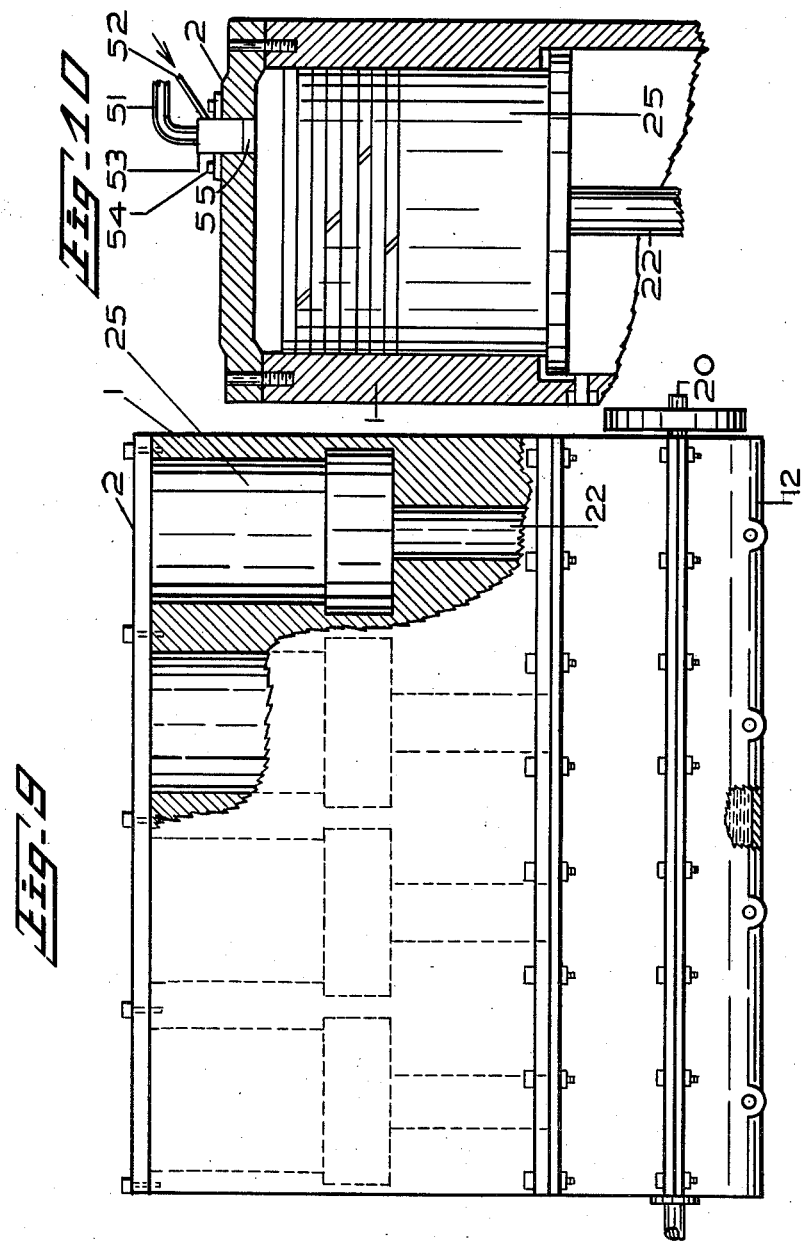

United States Patent Office 3,053,342
Patented Sept. 11, 1962

3,053,342
INTERNAL COMBUSTION ENGINE
Arthur Percival Mansoff, Dauphin, Manitoba, Canada
Filed Mar. 18, 1959, Ser. No. 800,252
2 Claims. (Cl. 184—6)

This invention relates to internal combustion engines of a character as disclosed in a patent previously granted to me under Number 2,381,832, and has reference more particularly to an improved oiling system for the engine and improvements in the piston and cylinder assembly.

The present oiling system, which is thought to be novel in the art, is designed to feed oil under pressure to the piston and by this always have oil inside the piston rings. The oil level in the piston is controlled by an overflow opening, the piston rod having a hollow bore through which the oil flows back to the crank case. This return surplus oil serves to lubricate the connecting rod cross head.

The engine as herein disclosed also has an improved air compression system by which air under pressure is delivered to the combustion chamber for scavenging and by virtue of an unequal air capacity between an air compression chamber and the combustion chamber a pressure air feed to the combustion chamber is provided.

The present engine design eliminates valves and cam shaft, and is adapted for use either as a two cycle or four cycle engine by changing the injection feed control, and further may be converted to a diesel fuel system.

In the drawings, wherein is shown a preferred embodiment of the engine,

FIG. 2 is a similar view to that in FIGURE 1, but with the piston shown at the conclusion of the power stroke.

FIG. 3 is a detail enlarged side view of the fuel intake for the combustion chamber and including the fuel heating attachment, the showing being partly in section and broken away.

FIG. 4 is an enlarged end view of the fuel intake attachment as viewed from the cylinder end.

FIG. 5 is a detail enlarged end view of the fuel intake attachment, shown partly in section and broken away.

FIG. 6 shows a side view of the piston rod and piston for the lower cylinder, shown partly in section and broken away.

FIG. 7 shows a side view, partly in section, of the lower end portion of the locking screw for the piston rod.

FIG. 8 is an end view showing the piston rod connecting element and locking screw.

FIG. 9 is a side view illustrating a four cylinder engine assembly, shown with the upper part of the casing broken away to disclose in part the cylinders and connecting rods of an upper piston, and the lower part broken away and in section, showing the interior of the oil case.

FIG. 10 is a side elevation in vertical section of a cylinder fragment and piston with diesel firing elements.

Figure 1:
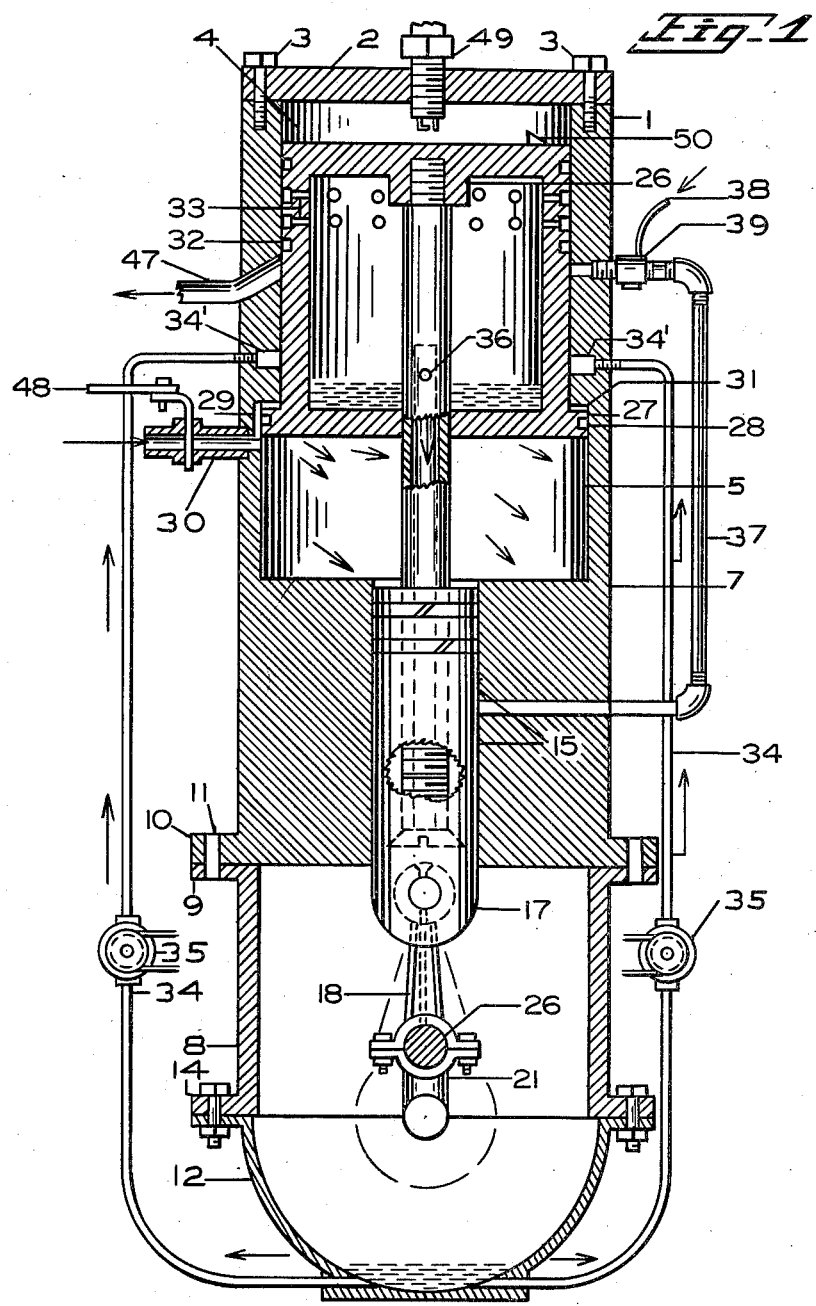
FIG. 1 is a side view, largely in section, of an engine and parts embodying my improvements, shown with the piston at the conclusion of its compression stroke.

Having reference to the drawings there is shown a cylinder 1 with head 2 secured thereon by bolts 3. The cylinder includes an upper or combustion chamber 4, below which is an air compression chamber 5 of greater capacity that the combustion chamber.

Below the air compression chamber in the cylinder is an auxiliary air compression chamber 6 of considerably less diameter than the chamber 5 and axially aligned therewith and extending through a solid block portion 7 of the cylinder.

Below the cylinder 1 is an extension cylinder section 8 with annular flange 9 by which it is attachable to the lower end of the cylinder 1 by means of bolts or the like engaging an integral external flange 10 on the cylinder block through alignable openings 11 in the flanges.

Further, to the lower end of the cylinder section 8 is attached a crank casing 12, this casing having an annular flange 13 opposing an external flange 14 on the section 8 and attachable thereto by bolts 14'.

Mounted to be endwise reciprocable in the auxiliary air compression chamber 6 is a secondary piston 15 with sealing rings 16, this piston having a divided end 17 in which is pivotally engaged a connecting rod 18 on a pin 19, this rod engaging a crank shaft 20 by a bearing 21.

The secondary piston 15 has threaded therein a piston rod 22 secured by a locking screw 23 countersunk in the lower end of the piston. Through the lower part of the piston 15 and screw 23 extends a bore 24 for passage of oil downward to the crank case from the main piston. The piston 25 includes a boss 26 on the under side of the piston head in which the rod 22 is threadably engaged. The piston further has a series of rings 32, the grooves for the middle two of which connect by oil passages 33 with the interior of the piston.

The lower end of the piston 25 has an integral flange portion 27 of greater diameter than the body of the piston and complementary to the chamber 5 for reciprocation therein, this lower portion 27 including a sealing ring 28. To permit escape of air between the lower flange of the piston and an annular shoulder 31 at the lower end of the upper part of the cylinder an air passage 29 is provided delivering to an air inlet 30.

Between the crank casing 12 and the cylinder 1 at the lower part of the combustion chamber 4 are oil pipes 34 through which oil under pressure from pumps 35 is injected into the cylinder through outlets 34' in the cylinder. Excess oil accumulating within the piston drains by an opening 36 through the bore 24 of the piston rod 22.

Compressed air from the chamber 5 and auxiliary chamber 6 is carried by a pipe line 37 to the combustion chamber 4. Interposed in this pipe line is a mixing chamber 39 to which a fuel line 38 delivers, this mixing chamber receiving air from the pipe line 37 and delivering it through an end section 40, FIGURE 3, threaded in an opening 41 of the cylinder wall. Below the chamber 39 is detachably secured a heating box 42 with an electric heating element mounted in a tube 43, and including wiring 44 for connection to a battery.

For conveying heat from the box 42 to the chamber 39 a series of baffle plates 45 are provided welded in the bottom of the chamber 39 and projecting downward into the heating chamber and upward into the mixing chamber in the path of air from the pipe 37.

There is also provided an air deflector 46 depending within the mixing chamber in the path of travel of air delivered by the pipe line 37 and adapted to deflect the air against the baffle plates.

At 47 is shown the exhaust for the waste gases from the combustion chamber 4, and at 48 a throttle for the air inlet 30. There is also indicated a spark plug 49. Further, the piston 25 has a deflector 50 for incoming fuel.

In FIGURE 9 a series of four engine units is shown connecting to the crank shaft 20.

In FIGURE 10 is disclosed a fragment of a cylinder with fuel feed for use in a diesel power unit, this consisting of an air line 51, fuel line 52 and heating element 53 attached by bolts 54 and inset in a fuel inlet 55 in the cylinder head.

In the use of the device a pressure feed at the air inlet port of the combustion chamber would be provided delivering through the fuel pipe line 37 and mixing chamber 39. Air under pressure feeds into the combustion chamber when the outlet port of the air compression chamber 6 is opened by the downward movement of the piston 15, the inlet port of the combustion chamber opening at the same time, and this air, highly compressed in the chamber 6, is used to clean out the burnt gases in the combustion chamber. As the piston 25 moves back to cover the air inlet port in the chamber 6 the injection of the new fuel takes place. This fuel will come from an injection fuel pump, such as in common use, by way of the inlet pipe 38 and is sprayed on the electrically heated baffle plates 45.

With this type of fuel feed the engine may be used as a two cycle unit, a very simplified fuel system thus being provided applicable to different fuels, except diesel, the system being capable of use as a four cycle unit by changing the injector feed control. For use as a diesel, high pressure fuel jets would be mounted in the head, as shown in FIGURE 10.

The fuel mixing chamber 39 includes a shielded heating element and a retainer for the liquid fuel, which would be used to assist in starting in cold weather. The element could be thermostatically controlled by heat of the intake port or by a switch as desired.

The oiling system for the unit delivers oil through the oil lines 34 to that portion of the cylinder in which the piston 25 operates. On this piston are sealing rings 32, the term having reference to the rings and the annular grooves in which they are mounted. There are four such rings in the present showing, the two middle rings of which connect by the oil passages 33 to the interior of the piston. These rings always have a few thousandths of an inch clearance in the grooves of the piston and the rings are spaced apart. The oil is injected under pressure and lubricates the rings, and excess oil is freed by passing through the passages 33 into the piston. Excess oil in the piston is drained through the outlet 36 (FIG. 1) and through the bore 24 (FIG. 7) in the rod 22 to the crank case from where it is pumped through the pipes 34 for lubricating the piston. Oil is also forced along the ring edges when the outlets for the oil lines 34 are passed by the rings.

The heating element in the tube 43 consists of an insulated wire and to this tube the baffle plates are welded. It can be switched on or off as desired.

Having thus particularly described and ascertained the nature of my said invention, what I claim and wish to secure by Letters Patent is, 1. In an oiling system for the piston of an internal combustion engine, said piston having a closed lower end and, said engine having a cylinder in which the piston is mounted and a crank case below the cylinder, and including pipe lines delivering oil under pressure from the crank case discharging through outlets in the cylinder, and said piston having a piston rod with a bore extending from the lower end to within the piston and sealing rings on the piston, characterized by said piston having annular inlet openings from some of the sealing rings extending to the interior of the piston, the outlets for the pipe lines in the cylinder being located to be covered by the piston throughout the piston stroke and the piston rod extending upwardly within the piston and having an outlet for discharge of oil from the piston through the piston rod bore spaced above the closed lower end of the piston to permit accumulation of an oil pool within the piston.

2. An internal combustion engine oiling system as set out in claim 1 and including means rigidly attaching the upper end of the piston rod to the upper end of the piston, an integral block at the lower end of the cylinder, said block having a bore through which the piston rod passes, and a secondary piston on the piston rod reciprocating within the block bore.

References Cited in the file of this patent

UNITED STATES PATENTS

| | | |
|---|---|---|
| 877,590 | Oulton | Jan. 28, 1908 |
| 973,792 | Leech | Oct. 25, 1910 |
| 1,063,602 | Russ | June 3, 1913 |
| 1,383,518 | Biser | July 5, 1921 |
| 1,597,706 | Aldous | Aug. 31, 1926 |
| 1,611,283 | Scott | Dec. 21, 1926 |
| 1,643,674 | Miller | Sept. 27, 1927 |
| 1,731,601 | Turney | Oct. 15, 1929 |
| 1,992,339 | Winslow | Feb. 26, 1935 |
| 2,094,828 | Spelts | Oct. 5, 1937 |
| 2,139,777 | Skok et al. | Dec. 13, 1938 |
| 2,273,095 | Fitch | Feb. 17, 1942 |
| 2,396,627 | Wohlmeyer | Mar. 12, 1946 |
| 2,582,389 | McDonnell | Jan. 15, 1952 |

FOREIGN PATENTS

| | | |
|---|---|---|
| 401,778 | Italy | Sept. 8, 1942 |